(12) United States Patent
Aoki et al.

(10) Patent No.: US 10,011,095 B2
(45) Date of Patent: Jul. 3, 2018

(54) SYNTHETIC RESIN LAMINATE

(71) Applicants: MITSUBISHI GAS CHEMICAL COMPANY, INC., Tokyo (JP); MGC FILSHEET CO., LTD., Saitama (JP)

(72) Inventors: Toshinari Aoki, Osaka (JP); Takeshi Onishi, Tokyo (JP); Kosei Hino, Kanagawa (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 170 days.

(21) Appl. No.: 14/379,401

(22) PCT Filed: Feb. 19, 2013

(86) PCT No.: PCT/JP2013/053916
§ 371 (c)(1),
(2) Date: Aug. 18, 2014

(87) PCT Pub. No.: WO2013/125500
PCT Pub. Date: Aug. 29, 2013

(65) Prior Publication Data
US 2015/0017408 A1    Jan. 15, 2015

(30) Foreign Application Priority Data
Feb. 22, 2012    (JP) ................. 2012-036057

(51) Int. Cl.
| B32B 27/08 | (2006.01) |
| B32B 27/30 | (2006.01) |
| B32B 27/36 | (2006.01) |
| C08L 69/00 | (2006.01) |
| C08L 33/12 | (2006.01) |
| B32B 27/16 | (2006.01) |

(52) U.S. Cl.
CPC ............. B32B 27/08 (2013.01); B32B 27/16 (2013.01); B32B 27/30 (2013.01); B32B 27/308 (2013.01); B32B 27/36 (2013.01); B32B 27/365 (2013.01); C08L 33/12 (2013.01); C08L 69/00 (2013.01); B32B 2250/24 (2013.01); B32B 2255/10 (2013.01); B32B 2255/26 (2013.01); B32B 2270/00 (2013.01); B32B 2307/306 (2013.01); B32B 2307/412 (2013.01); B32B 2307/536 (2013.01); B32B 2307/558 (2013.01); B32B 2307/702 (2013.01); B32B 2307/712 (2013.01); B32B 2307/726 (2013.01); B32B 2307/732 (2013.01); B32B 2307/734 (2013.01); Y10T 428/24967 (2015.01); Y10T 428/31507 (2015.04)

(58) Field of Classification Search
CPC ....... B32B 27/08; B32B 27/365; B32B 27/30; B32B 27/308; Y10T 428/31507; Y10T 428/24967; C08L 33/12; C08L 69/00
See application file for complete search history.

(56) References Cited

U.S. PATENT DOCUMENTS

| 4,439,494 A | * | 3/1984 | Olson | ................. | C08J 7/047 |
| | | | | | 427/385.5 |
| 4,906,696 A | | 3/1990 | Fischer et al. | | |
| 4,977,212 A | | 12/1990 | Akazawa et al. | | |
| 5,059,580 A | | 10/1991 | Shibata et al. | | |
| 5,061,558 A | | 10/1991 | Fischer et al. | | |
| 5,108,835 A | * | 4/1992 | Hahnsen | ................. | B32B 27/08 |
| | | | | | 428/334 |
| 5,759,689 A | * | 6/1998 | Sieloff | ................. | C07C 49/83 |
| | | | | | 428/412 |
| 6,359,042 B1 | * | 3/2002 | Anders | ................. | B32B 27/18 |
| | | | | | 524/91 |
| 2007/0100088 A1 | * | 5/2007 | Gallucci | ................. | C08L 67/03 |
| | | | | | 525/446 |
| 2009/0136733 A1 | | 5/2009 | Maekawa et al. | | |
| 2009/0263663 A1 | | 10/2009 | Ogawa et al. | | |

(Continued)

FOREIGN PATENT DOCUMENTS

| CN | 101454210 | 6/2009 |
| CN | 101560319 | 10/2009 |

(Continued)

OTHER PUBLICATIONS

Search Report issued by European patent office in Patent Application No. 13751830.4, dated Sep. 7, 2015.
U.S. Appl. No. 14/399,705 to Kosei Hino et al., which was filed Nov. 7, 2014.
Search report from PCT/JP2013/053916, dated May 28, 2013.

*Primary Examiner* — Prashant J Khatri

(74) *Attorney, Agent, or Firm* — Greenblum & Bernstein, P.L.C.

(57) ABSTRACT

The present invention has an object of providing a synthetic resin laminate that is excellent in shape stability against a high temperature and high humidity environment, surface hardness and the like. The above object is achieved by a synthetic resin laminate, comprising a substrate layer (B) containing polycarbonate; and a resin layer (A) laminated on one or both of two surfaces of the resin layer (B), the resin layer (A) containing 5 to 55% by mass of (meth)acrylate copolymer (C) and 95 to 45% by mass of polycarbonate (D), wherein the (meth)acrylate copolymer (C) contains an aromatic (meth)acrylate unit (c1) and a methyl methacrylate unit (c2) at a mass ratio (c1/c2) of 5-80/20-95, and the (meth)acrylate copolymer (C) has a mass-average molecular weight of 5,000 to 30,000; and the polycarbonate (D) has a mass-average molecular weight of 21,000 to 40,000.

11 Claims, No Drawings

(56) References Cited

U.S. PATENT DOCUMENTS

| | | | |
|---|---|---|---|
| 2010/0152357 A1* | 6/2010 | Kwon | C08L 33/08 524/502 |
| 2011/0086227 A1 | 4/2011 | Minemura et al. | |
| 2011/0244242 A1 | 10/2011 | Oguro et al. | |
| 2013/0059158 A1 | 3/2013 | Oguro et al. | |
| 2013/0137801 A1 | 5/2013 | Ha et al. | |

FOREIGN PATENT DOCUMENTS

| | | | |
|---|---|---|---|
| CN | 102137756 | 7/2011 | |
| EP | 0732355 A1 * | 9/1996 | C08J 7/047 |
| EP | 1 680 276 | 11/2009 | |
| JP | 08-73599 | 3/1996 | |
| JP | 2006-103169 | 4/2006 | |
| JP | 2009-221386 | 10/2009 | |
| JP | 2009-256408 | 11/2009 | |
| JP | 2010-049078 | 3/2010 | |
| JP | 2010-116501 A | 5/2010 | |
| JP | 2010-167659 | 8/2010 | |
| JP | 2010-188719 | 9/2010 | |
| JP | 2011-052236 A | 3/2011 | |
| JP | 2012-025790 A | 2/2012 | |
| WO | 2007/140100 | 12/2007 | |
| WO | 2011/145630 | 11/2011 | |
| WO | 2012/015109 | 2/2012 | |

* cited by examiner

SYNTHETIC RESIN LAMINATE

TECHNICAL FIELD

The present invention relates to a synthetic resin laminate, and more specifically to a synthetic resin laminate which is used for a transparent substrate material or protective material, which includes a layer containing a polycarbonate resin and a resin layer including a specific meth(acrylate) copolymer and a specific polycarbonate resin, and which are excellent in shape stability against a high temperature and high humidity environment, surface hardness, impact resistance, climate resistance and heat resistance.

BACKGROUND ART

A polycarbonate resin plate is excellent in transparency, impact resistance and heat resistance, and is used for soundproof walls, carports, signboards, glazing materials, illumination devices and the like. However, a polycarbonate resin plate has a disadvantage of having a low surface hardness and is easy to be scratched, and thus the use thereof is limited.

In order to overcome the disadvantage, Patent Document 1 proposes a method of coating a surface of a polycarbonate resin plate with an ultraviolet-curable resin or the like, and a method of hard-coating a substrate obtained as a result of coextrusion of a polycarbonate resin and an acrylic resin.

However, a surface of a polycarbonate resin that is merely hard-coated does not have a required pencil hardness and is not usable for uses which require a certain level of surface hardness.

A method of coating a surface layer with an acrylic resin provides a surface hardness increased to some extent, and the resultant polycarbonate resin plate is usable for a wider range of uses including a front plate of an information display device or the like. However, the layer obtained by this method has a two-layer structure of different materials and may be significantly warped due to a difference in water absorption characteristic or heat resistance, such as glass transition temperature or the like, between the acrylic resin and the polycarbonate resin. Such a surface causes a flaw in a use in which an environmental change is involved.

As a laminate that is suppressed in warping, Patent Document 2 discloses a laminate including a resin having a low water absorption ratio laminated on a polycarbonate resin. The conditions of 40° C./90% used in the environmental test are insufficient as high temperature and high humidity conditions. This test is not considered to be usable to evaluate the level of warping in a sufficiently strict manner. The MS resin used in this publication is generally considered to have low heat resistance and may cause a problem on a post-treatment stage.

As a laminate that is suppressed in warping, there is a laminate including acrylic resin layers provided on both of two surfaces of a polycarbonate resin layer. However, when a planar impact is applied to one of the surfaces of the laminate, the acrylic resin layer on the other surface of the laminate is easily cracked. This may cause a problem in a certain type of use.

PRIOR ART DOCUMENTS

Patent Documents

Patent Document 1: Japanese Laid-Open Patent Publication No. 2006-103169

Patent Document 4: Japanese Laid-Open Patent Publication No. 2010-167659

SUMMARY OF THE INVENTION

Problems to be Solved by the Invention

In light of the above-described situation, the present invention has an object of providing a synthetic resin laminate that is excellent in shape stability against a high temperature and high humidity environment, surface hardness, impact resistance, climate resistance and heat resistance and usable for a transparent substrate material or protective material.

Means for Solving the Problems

As a result of accumulating active studies in order to solve the above-described problems, the present inventors found that a synthetic resin laminate having the above-described characteristics is obtained by laminating a resin layer containing a specific (meth)acrylate copolymer and a specific polycarbonate resin on one surface of a layer containing a polycarbonate resin, and thus achieved the present invention.

Namely, the present invention provides a synthetic resin laminate and a transparent material including the synthetic resin laminate described below.

<1> A synthetic resin laminate, comprising:
a substrate layer (B) containing polycarbonate; and
a resin layer (A) laminated on one or both of two surfaces of the resin layer (B), the resin layer (A) containing 5 to 55% by mass of (meth)acrylate copolymer (C) and 95 to 45% by mass of polycarbonate (D),
wherein the (meth)acrylate copolymer (C) contains an aromatic (meth)acrylate unit (c1) and a methyl methacrylate unit (c2) at a mass ratio (c1/c2) of 5-80/20-95, and the (meth)acrylate copolymer (C) has a mass-average molecular weight of 5,000 to 30,000; and wherein the polycarbonate (D) has a mass-average molecular weight of 21,000 to 40,000.

<2> The synthetic resin laminate according to <1> above, wherein the resin layer (A) has a glass transition point of 110 to 130° C.

<3> The synthetic resin laminate according to <1> or <2> above, wherein the resin layer (A) has a water absorption ratio of 0.03 to 0.28%.

<4> The synthetic resin laminate according to any one of <1> to <3> above, wherein the resin layer (A) has a thickness of 10 to 250 μm, the synthetic resin laminate has a total thickness (X) of 0.1 to 2.0 mm, and the thickness ratio (A)/(X) is 0.01 to 0.5.

<5> The synthetic resin laminate according to any one of <1> to <4> above, wherein the substrate layer (B) has a mass-average molecular weight of 18,000 to 40,000.

<6> The synthetic resin laminate according to any one of <1> to <5> above, wherein the resin layer (A) and/or the substrate layer (B) contains an ultraviolet absorber.

<7> The synthetic resin laminate according to any one of <1> to <6> above, wherein the resin layer (A) is hard-coated.

<8> The synthetic resin laminate according to any one of <1> to <6> above, wherein the resin layer (A) and the substrate layer (B) are hard-coated.

<9> The synthetic resin laminate according to any one of <1> to <8> above, wherein one or both of two surfaces of the synthetic resin laminate is obtained as a result of at least one of a reflection preventive treatment, an antifouling treatment, an anti-fingerprint treatment, an antistatic treatment, a climate-proof treatment, and an anti-glare treatment.
<10> A transparent substrate material, comprising the synthetic resin laminate according to any one of <1> to <9> above.
<11> A transparent protective material, comprising the synthetic resin laminate according to any one of <1> to <9> above.

Advantageous Effects of Invention

The present invention provides a synthetic resin laminate that is excellent in shape stability against a high temperature and high humidity environment, surface hardness, impact resistance, climate resistance and heat resistance, and such a synthetic resin laminate is used for a transparent substrate material or a transparent protective material. Specifically, the synthetic resin laminate is preferably used for, for example, mobile display devices including mobile phone terminals, mobile electronic gadgets, mobile information terminals, mobile PCs and the like; and installation-type display devices including notebook PCs, desktop PCs, liquid crystal monitors, liquid crystal TVs and the like.

EMBODIMENTS FOR CARRYING OUT THE INVENTION

Hereinafter, the present invention will be described in detail by way of production examples and examples, but the present invention is not limited to the following production examples, examples or the like and may be modified in any way without significantly departing from the gist thereof.

A synthetic resin laminate according to the present invention includes a substrate layer (B) containing polycarbonate; and a resin layer (A) that is laminated on one or both of two surfaces of the resin layer (B) and contains 5 to 55% by mass of (meth)acrylate copolymer (C) and 95 to 45% by mass of polycarbonate (D).

The (meth)acrylate copolymer (C) contains an aromatic (meth)acrylate unit (c1) and a methyl methacrylate unit (c2) at a mass ratio (c1/c2) of 5-80/20-95. The (meth)acrylate copolymer (C) has a mass-average molecular weight of 5,000 to 30,000, and the polycarbonate (D) has a mass-average molecular weight of 21,000 to 40,000.

In the synthetic resin laminate according to the present invention, a resin layer (A) containing a specific (meth)acrylate copolymer and specific polycarbonate is laminated on one or both of two surfaces of a substrate layer (B) containing polycarbonate in order to increase the surface hardness of the polycarbonate. In the case where the resin layer (A) is laminated on one of the substrate layer (B), even when a planar impact is applied to the resin layer (A), which has a hard structure, the impact is alleviated because the substrate layer (B), which has a soft structure, is present on the opposite side. Therefore, the synthetic resin laminate is not easily destroyed by the impact. Since the resin layer (A) has a water absorption ratio that is close to that of polycarbonate, the problem of warping, which is caused when resins having different water absorption ratios are laminated, is alleviated.

In the case where the substrate includes the resin layer (A) laminated on both of two surfaces of the substrate layer (B), even when a planar impact is applied to one of the surfaces of the laminate, the other surface is not easily destroyed by the impact because the resin layer (A) contains polycarbonate and has excellent impact resistance. In addition, since the same resin is laminated on both of the two surfaces, the structure is symmetrical, which preferably further suppresses warping.

There is no specific limitation on the method for producing the synthetic resin laminate according to the present invention. There are various methods including, for example, a method of laminating the resin layer (A) and the substrate layer (B) separately formed and pressure-contacting the layers by heating; a method of laminating the resin layer (A) and the substrate layer (B) separately formed and boding the layers by an adhesive; a method of coextruding the resin layer (A) and the substrate layer (B); and a method of integrating a polycarbonate resin, which is a main component of the substrate layer (B), with the resin layer (A) formed in advance, by use of in-molding. From the points of view of production cost and productivity, the method of coextrusion is preferable.

The polycarbonate used in the substrate layer (B) and the polycarbonate (D) used in the resin layer (A) according to the present invention may be of any type that includes a —[O—R—OCO]— unit (R represents an aliphatic group, an aromatic group, a material containing both of an aliphatic group and an aromatic group, or such a material having a straight chain structure or a branched structure) containing a carbonate ester bond in a molecular backbone thereof.

A method for producing the polycarbonate used in the substrate layer (B) and the polycarbonate (D) used in the substrate layer (A) according to the present invention may be optionally selected from known methods including a phosgene method (interface polymerization method), a transesterification method (melting method) and the like in accordance with the monomer to be used.

The (meth)acrylate copolymer (C) used in the present invention contains the aromatic (meth)acrylate unit (c1) and the methyl methacrylate unit (c2). In the present invention, the term "(meth)acrylate" refers to an acrylate or a methacrylate.

An aromatic (meth)acrylate forming the aromatic (meth)acrylate unit (c1) is a (meth)acrylate containing an aromatic group in an ester moiety thereof. Examples of the aromatic (meth)acrylate include phenyl (meth)acrylate, benzyl (meth)acrylate, and the like. These materials may be used independently or in a combination of two or more. Among these materials, phenyl methacrylate and benzyl methacrylate are preferable. Phenyl methacrylate is more preferable. The presence of the aromatic (meth)acrylate unit (c1) can increase the transparency of a molded body containing a mixture of the aromatic (meth)acrylate unit (c1) and an aromatic polycarbonate resin.

A monomer forming the methyl methacrylate unit (c2) is methyl methacrylate. The methyl methacrylate (c2) has a property of being sufficiently dispersed with a polycarbonate-based resin and transferring to the surface of the molded body, and thus can increase the surface hardness of the molded body.

The (meth)acrylate copolymer (C) contains 5 to 80% by mass of aromatic (meth)acrylate unit (c1) and 20 to 95% by mass of methyl methacrylate unit (c2) (it should be noted that the total of (c1) and (c2) is 100% by mass). Where the content of the aromatic (meth)acrylate unit (c1) in the (meth)acrylate copolymer (C) is 5% by mass or greater, an area having a high content of the (meth)acrylate copolymer (C) maintains transparency. Where the content of the aromatic (meth)acrylate unit (c1) in the (meth)acrylate copolymer (C) is 80% by mass or less, the compatibility of the aromatic (meth)acrylate unit (c1) with aromatic polycarbonate is not too high and thus the transferability to the surface of the molded body is not decreased. Therefore, the surface hardness is not decreased.

The mass-average molecular weight of the (meth)acrylate copolymer (C) is 5,000 to 30,000, and is preferably 10,000 to 25,000. Where the mass-average molecular weight is 5,000 to 30,000, the (meth)acrylate copolymer (C) has good compatibility with aromatic polycarbonate and thus has a good effect of increasing the surface hardness. The mass-average molecular weight (Mw), the number-average molecular weight (Mn) and the molecular weight distribution (Mw/Mn) of the (meth)acrylate copolymer (C) can be measured by gel permeation chromatography by use of THF or chloroform as a solvent.

According to the present invention, there is no specific limitation on the method for producing the resin layer (A). Any known method is applicable. For example, necessary components are mixed in advance by use of a mixer such as, for example, a tumbler, a Henschel mixer, a super mixer or the like, and then are melted and kneaded by use of a machine such as a banbury mixer, a roll, a brabender, a monoaxial extruder, a biaxial extruder, a pressurized kneader or the like.

According to the present invention, the composition ratio of the (meth)acrylate copolymer (C) and the polycarbonate (D) is 5 to 55% by mass of the (C) component and 95 to 45% by mass of the component (D). Preferably, the ratio is 20 to 50% by mass of the component (C) and 80 to 50% by mass of the component (D). More preferably, the ratio is 30 to 50% by mass of the component (C) and 70 to 50% by mass of the component (D). Where the ratio is within such a range, the resin layer (A) maintains the transparency, and the various properties thereof including the surface hardness, the impact resistance and the water absorption ratio are well balanced.

According to the present invention, the mass-average molecular weight of the polycarbonate (D) is determined based on ease of mixing (ease of dispersion) with the (meth)acrylate copolymer (C) and ease of production of the resin layer (A). Namely, where the mass-average molecular weight of the polycarbonate (D) is too large, the melt viscosity difference between the component (C) and the component (D) is too large and the components are not mixed (dispersed) sufficiently. This causes a flaw that the transparency of the resin layer (A) is deteriorated or that the melding and kneading treatment cannot be performed stably. By contrast, where the mass-average molecular weight of the polycarbonate (D) is too small, the strength of the resin layer (A) is decreased, which causes a problem that the impact resistance of the synthetic resin laminate is decreased. The mass-average molecular weight of the polycarbonate (D) is preferably in the range of 21,000 to 40,000, more preferably 24,000 to 38,000, and still more preferably in the range of 27,000 to 36,000.

According to the present invention, a glass transition point of the resin layer (A) influences the heat resistance of the synthetic resin laminate. Namely, where the glass transition point is too low, the heat resistance of the synthetic resin laminate is decreased, which is not preferable. Where the glass transition point is too high, an excessive heat source may occasionally be needed to laminate the resin layer (A), which is not preferable. The glass transition point of the resin layer (A) is preferably 110 to 130° C., more preferably 115 to 130° C., and still more preferably 118 to 125° C.

According to the present invention, the water absorption ratio of the resin layer (A) influences the deforming amount (warping amount) of the synthetic resin laminate when the laminate is exposed to a high temperature and high humidity environment. Namely, where the water absorption ratio is too high, the deforming amount (g) is increased, which is not preferable. Where the water absorption ratio is too low, the high/low relationship of the water absorption ratio between the resin layer (A) and the substrate layer (B) is reversed. This may occasionally result in a deforming amount (h) in the direction opposite to the above-described deformation, which is not preferable. The water absorption ratio of the resin layer (A) is preferably 0.03 to 0.28%, more preferably 0.05 to 0.2%, and still more preferably 0.1 to 0.17%.

According to the present invention, the thickness of the resin layer (A) influences the surface hardness and the impact resistance of the synthetic resin laminate. Namely, where the resin layer (A) is too thin, the surface hardness is decreased, which is not preferable. Where the resin layer (A) is too thick, the impact resistance is decreased, which is not preferable. The thickness of the resin layer (A) is preferably 10 to 250 µm, more preferably 30 to 200 µm, and still more preferably 60 to 100 µm.

According to the present invention, the total thickness of the synthetic resin laminate influences the deforming amount (warping amount) of the synthetic resin laminate when the laminate is exposed to a high temperature and high humidity environment and the impact resistance of the synthetic resin laminate. Namely, where the total thickness is too small, the deforming amount (warping amount) of the synthetic resin laminate when the laminate is exposed to a high temperature and high humidity environment is increased and the impact resistance is decreased. Where the total thickness is large, the deforming amount (warping amount) of the synthetic resin laminate when the laminate is exposed to a high temperature and high humidity environment is small and a certain level of impact resistance is guaranteed. However, where the total thickness is unnecessarily large, this means that an excessive amount of material is used for the polycarbonate (D), which is not economical. The total thickness of the synthetic resin laminate is preferably 0.1 to 2.0 mm, more preferably 0.3 to 2.0 mm, and still more preferably 0.5 to 1.5 mm.

According to the present invention, the ratio of the thickness of the resin layer (A) with respect to the total thickness (X) of the synthetic resin laminate, namely, (A)/(X), influences the surface hardness and the impact resistance of the synthetic resin laminate. Namely, where the thickness ratio is too low, the surface hardness is decreased, which is not preferable. Where the thickness ratio is too high, the impact resistance is decreased, which is not preferable. The thickness ratio is preferably 0.01 to 0.5, more preferably 0.015 to 0.4, and more preferably 0.02 to 0.3.

According to the present invention, the mass-average molecular weight of the substrate layer (B) influences the impact resistance and the molding conditions of the synthetic resin laminate. Namely, where the mass-average molecular weight is too small, the impact resistance of the synthetic resin laminate is decreased, which is not preferable. Where the mass-average molecular weight is too large, an excessive heat source may occasionally be needed to laminate the resin layer (A), which is not preferable. Depending on the molding method, a high temperature is needed. In this case, the resin layer (A) is exposed to such a high temperature, which may adversely influence the heat stability thereof. The mass-average molecular weight of the substrate layer (B) is preferably 18,000 to 40,000, more preferably 23,000 to 38,000, and still more preferably 27,000 to 36,000.

According to the present invention, the resin layer (A) and/or the substrate layer (B) may be mixed with an ultraviolet absorber for use. Where the content of the ultraviolet absorber is too low, the light resistance is insufficient. Where the content of the ultraviolet absorber is too high, an excessive amount of ultraviolet absorber may be scattered due to the high temperature and contaminate the molding environment to cause a flaw when a certain molding method is used. The content of the ultraviolet absorber is 0 to 5% by mass, preferably 0 to 3% by mass, and more preferably 0 to 1% by mass. Usable as ultraviolet absorbers are, for example, benzophenone-based ultraviolet absorbers including 2,4-dihydroxybenzophenone, 2-hydroxy-4-methoxybenzophenone, 2-hydroxy-4-n-octoxybenzophenone, 2-hydroxy-4-dodecyloxybenzophenone, 2-hydroxy-4-octadecyloxybenzophenone, 2,2'-dihydroxy-4-methoxybenzophenone, 2,2'-dihydroxy-4,4'-dimethoxybenzophenone, 2,2'-4,4'-tetrahydroxybenzophenone, and the like; benzotriazole-based ultraviolet absorbers including 2-(2-hydroxy-5-methylphenyl)benzotriazole, 2-(2-hydroxy-3.5-di-t-butylphenyl)benzotriazole, 2-(2-hydroxy-3-t-butyl-5-methylphenyl)benzotriazole, (2H-benzotriazole-2-yl)-4,6-bis(1-methyl-1-phenylethyl)phenol, and the like; benzoate-based ultraviolet absorbers including phenyl salicylate, 2,4-di-t-butylphenyl-3,5-di-t-butyl-4-hydroxybenzoate and the like; hindered amine-based ultraviolet absorbers including bis(2,2,6,6-tetramethylpiperidine-4-yl)sebacate and the like; and triazine-based ultraviolet absorbers including 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenhyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, and the like. There is no specific limitation on the method for mixing. Usable methods include a method of compounding the entire amounts, a method of dry-blending master batches, a method of dry-blending the entire amounts, and the like.

According to the present invention, the resin layer (A) and/or the substrate layer (B) may be mixed with any of various additives for use. Usable additives are, for example, antioxidants, anti-coloring agents, antistatic agents, releasing agents, lubricants, dyes, pigments, plasticizers, flame-retardants, resin modifiers, compatibilizers, and reinforcing agents such as organic fillers, inorganic fillers and the like. There is no specific limitation on the method for mixing. Usable methods include a method of compounding the entire amounts, a method of dry-blending master batches, a method of dry-blending the entire amounts, and the like.

According to the present invention, the hard-coating is performed by use of a hard-coat that cures a material by use of thermal energy and/or optical energy to form a hard-coat layer. Usable as hard-coats that cure a material by use of thermal energy are, for example, polyorganosiloxane-based and crosslinked acrylic resin-based thermosetting resin compositions. Usable as hard-coats that cure a material by use of optical energy are, for example, photocurable resin compositions produced by incorporating a photopolymerization initiator to a resin composition formed of a mono- and/or multi-functional acrylate monomer and/or oligomer.

According to the present invention, an example of hard-coat that cures a material by use of thermal energy and is to coat the resin layer (A) is a thermosetting resin composition produced as follows. 100 parts by weight of organotrialkoxysilane (a11), and 50 to 200 parts by weight of colloidal silica solution (a12) containing 10 to 50% by weight of colloidal silica having a particle diameter of 4 to 20 nm, are used to form a resin composition. To 100 parts by weight of this resin composition, 1 to 5 parts by weight of amine carboxylate and/or quaternary ammonium carboxylate (a13) is added.

According to the present invention, an example of hard-coat that cures a material by use of optical energy and is to coat the resin layer (A) is a photocurable resin composition produced as follows. 40 to 80% by weight of tris(acloxyethyl)isocyanurate (a21), and 20 to 40% by weight of bifunctional and/or trifunctional (meth)acrylate compound (a22) copolymerizable with (a21), are used to form a resin composition. To 100 parts by weight of this resin composition, 1 to 10 parts by weight of photopolymerization initiator (a23) is added.

According to the present invention, an example of hard-coat that cures a material by use of optical energy and is to coat the substrate layer (B) is a photocurable resin composition produced as follows. 20 to 60% by weight of 1,9-nonanedioldiacrylate (b1) and 40 to 80% by weight of compound (b2) formed of the following materials copolymerizable with (b1) are used to form a resin composition: at least bifunctional, namely, multi-functional (meth)acrylate monomer, and at least bifunctional, namely, multi-functional urethane (meth)acrylate oligomer and/or at least bifunctional, namely, multi-functional polyester (meth)acrylate oligomer and/or at least bifunctional, namely, multi-functional epoxy (meth)acrylate oligomer. To 100 parts by weight of the resin composition, 1 to 10 parts by weight of photopolymerization initiator (b3) is added.

According to the present invention, There is no specific limitation on the method for applying a hard-coat, and any known method is usable. Usable methods include, for example, a spin coat method, a dipping method, a spray method, a slide coat method, a bar coat method, a roll coat method, a gravure coat method, a meniscus coat method, a flexographic printing method, a screen printing method, a beat coat method, a brush method and the like.

In order to improve the adhesiveness of the hard-coat, the surface to be coated is occasionally pre-treated before being coated. Usable known methods of pre-treatment include, for example, a sandblast method, a solvent treatment method, a corona discharge treatment method, a chromic acid treatment method, a flame treatment method, a hot air treatment method, an ozone treatment method, an ultraviolet treatment method, a primer treatment method by use of a resin composition, and the like.

Preferably, the materials of the resin layer (A), the substrate layer (B) and the hard-coat are filtrated to be refined. When these materials are generated or laminated by use of a filter, a synthetic resin laminate having little external drawbacks such as attachment of foreign objects or defects can be provided. There is no specific limitation on the method of filtering. For example, a melt filtration method, a solution filtration or a combination thereof is usable.

There is no specific limitation on the filter to be used. Any known filter is usable. A filter to be used may be optionally selected in accordance with the use temperature, the viscosity and the filtering precision of each material. There is no specific limitation on the material of the filter. Usable materials include polypropylene, cotton, polyester, non-woven fabric of viscose rayon or glass fiber, roll of roving yarn, phenolic resin-impregnated cellulose, metal fiber non-woven sintered body, metal powder sintered body, breaker plate, and a combination thereof. In consideration of heat resistance, durability and pressure resistance, metal fiber non-woven sintered body is especially preferable.

The filtering precision for the resin layer (A) and the substrate layer (B) is 50 μm or less, preferably 30 μm or less, and more preferably 10 μm or less. The filtering precision for the hard-coat is 20 μm or less, preferably 10 μm or less, and more preferably 5 μm or less because the hard-coat is applied to the outermost layer of the resin laminate.

For filtrating the resin layer (A) and the substrate layer (B), it is preferable to use, for example, a polymer filter usable for performing melt filtration of a thermoplastic resin. Polymer filters are classified by the structure into a leaf disc filter, a candle filter, a pack disc filter, a cylindrical filter and the like. A leaf disc filter having a large effective filtration area is especially preferable.

According to the present invention, one or both of two surfaces of the synthetic resin laminate may be subjected to at least one of a reflection preventive treatment, an antifouling treatment, an antistatic treatment, a climate-proof treatment, and an anti-glare treatment. There is no specific limitation on the method for the reflection preventive treatment, the antifouling treatment, the antistatic treatment, the climate-proof treatment, or the anti-glare treatment. Any known method is usable. Usable methods include, for example, a method of applying a reflection reducing coat, a method of vapor-depositing a dielectric thin film, a method of applying an antistatic coat and the like.

EXAMPLES

Hereinafter, the present invention will be specifically described by way of examples. The present invention is not limited to these examples in any way.

The properties of laminate resins obtained in production examples were measured as follows, and synthetic resin laminates obtained in examples and comparative examples were evaluated as follows.

<Mass-Average Molecular Weight>

Standard polystyrene was dissolved in chloroform and measured by gel permeation chromatography (GPC) in advance. The resultant standard curve was used as the reference. A (meth)acrylate copolymer and a polycarbonate resin were measured by GPC in a similar manner. By comparing the results, the mass-average molecular weights of the (meth)acrylate copolymer and the polycarbonate resin were calculated. A GPC device used was as follows.

Device: Wates 2609
Column: Shodex GPC KF-805L; 8ϕ×300 mm; two coupled columns
Developing solvent: chloroform
Flow rate: 1 ml/min.
Temperature: 30° C.
Detector: UV . . . 486 nm polycarbonate
RI . . . special acrylic resin <Water Absorption Ratio>

In conformity with JIS-K7209, a pellet of each material was put to a petri dish in a thin and wide state such that the thickness would not exceed 5 mm and dried in an oven of a temperature of 80° C. for a night. Then, each pellet was kept in an environmental tester, set to a temperature of 23° C. and a relative humidity of 50%, for 24 hours to be adjusted in terms of the state. Then, the water absorption ratio [%] of the pellet was measured by a trace amount moisture meter CA-200 produced by Mitsubishi Chemical Corporation under a nitrogen gas flow.

<Glass Transition Point>

In conformity with JIS-K7121, an appropriate amount of pellet of each material was set in a thermal analyzer TG-DTA2000SA produced by BRUKER. Then, the temperature was raised at a rate of 20° C./min. in a nitrogen atmosphere to measure the glass transition point Tg [° C.].

<High Temperature and High Humidity Exposure Test>

Each of test pieces was cut out to have a size of 10×6 cm. The test piece was set in a holder supported at two positions, and kept in an environmental tester, set to a temperature of 23° C. and a relative humidity of 50%, for 24 hours to be adjusted in terms of the state. Then, warp was measured (pre-treatment warping amount). Next, the test piece was set in the holder, put into an environmental tester set to a temperature of 85° C. and a relative humidity of 85%, and kept for 120 hours in this state. The holder accommodating the test piece was moved into an environmental tester set to a temperature of 23° C. and a relative humidity of 50%, and kept for 4 hours in this state. Then, the warp was measured again (post-treatment warping amount). The warp was measured as follows. The test piece removed out of the holder was kept still in a horizontal state with a protruding part directed upward and scanned at an interval of 1 mm by use of a three-dimensional shape meter equipped with an electric stage. The protruding part at the center was measured as warp. The value of (post-treatment warping amount)−(pre-treatment warping amount) was set as the shape stability. Each 1 mm-thick non-coated test piece and each 1 mm-thick test piece having two coated surfaces were evaluated as being good when the change amount was 300 μm or less. Each 1 mm-thick test piece having one coated surface was evaluated as being good when the change amount was less than 1000 μm. Each 0.5 mm-thick non-coated test piece and each 0.5 mm-thick test piece having two coated surfaces were evaluated as being good when the change amount was 600 μm or less. Each 0.5 mm-thick test piece having one coated surface was evaluated as being good when the change amount was 1900 μm or less. The measuring limit of the meter is 2000 μm. A warping amount of 2000 μM or more was unmeasurable.

<Pencil Hardness Test>

In conformity with JIS K 5600-5-4, a pencil was pressed to a surface of the substrate layer (B) at an angle of 45 degree with respect to the surface and at a load of 750 g. The hardness of the pencil was gradually increased. The maximum hardness of the pencil which did not leave a scratch was set as the pencil hardness. Each non-hard-coated test piece was evaluated as being good when the pencil hardness was HB or higher, and each hard-coated test piece was evaluated as being good when the pencil hardness was H or higher.

<Impact Resistance Test>

Each of test pieces was cut out to have a size of 80 mm square. The test piece was left in an environment of a temperature of 23° C. and a relative humidity of 50% for 24 hours or longer to be adjusted in terms of the state. Then, the test piece was secured to a circular flange having a diameter of 50 mm with the substrate layer (B) directed upward. Onto the substrate layer (B), a metal weight having a tip diameter of 2.5 mm was dropped such that the tip of the weight would collide against the surface. The weight was gradually made heavier from 40 g to 160 g, or the position from which the weight was dropped was gradually made higher, so as to increase the fall energy. The maximum fall energy (J) which did not break the test piece was set as the impact resistance. Each 1 mm-thick non-hard-coated test piece, each 1 mm-thick test piece having one hard-coated surface, and each 1 mm-thick test piece having two hard-coated surfaces were evaluated as being good when not being broken by a fall energy of less than 0.9 J. Each 0.5 mm-thick non-hard-coated test piece, each 0.5 mm-thick test piece having one hard-coated surface, and each 0.5 mm-thick test piece having two hard-coated surfaces were evaluated as being good when not being broken by a fall energy of less than 0.3 J.
<Light Resistance Test>

This test was performed on test pieces coated with a hard-coat (a2). Each of test pieces was cut out to have a size of 8×5 cm. The test piece was left in an environment of a temperature of 23° C. and a relative humidity of 50% for 24 hours or longer to be adjusted in terms of the state. Then, the test piece was bonded to an iron plate by an adhesive tape with the resin layer (A) directed upward such that a central part thereof would be exposed to light. The test piece was set in a black box equipped with a UVB lamp (280 to 360 nm) having an output of 19 mW, and irradiated with the light for 72 hours. Before and after the UVB irradiation, YI was measured. When ΔYI was 1 or less, the test piece was evaluated as being good.
<Heat Resistance Test>

This test was performed on test pieces having a hard-coat applied on at least of one of the surfaces thereof. Each of test pieces was cut out to have a size of 10×20 cm. The test piece was scratched by a cutter such that a rectangle would be drawn at a position 1 cm inner to the outer circumference. The test piece was suspended, with one corner being pinched, in a drier having a temperature raised to any of various predetermined levels. After being left in this state for 30 minute, the test piece was removed out of the drier. When no crack was observed within the scratched rectangle at a temperature of 120° C. or higher, the test piece was evaluated as being good.

Production Example 1 [Production of Pellet for Laminate Resin (A11)]

30% by mass of Metablen H-880 (produced by Mitsubishi Rayon Co., Ltd.; mass-average molecular weight: 14,000; c1/c2=33/66) as the (meth)acrylate copolymer (C) and 70% by mass of Iupilon E-2000 (produced by Mitsubishi Engineering-Plastics Corporation; mass-average molecular weight: 36,000) as the polycarbonate (D) were put into a blender and mixed for 30 minutes. Then, the mixture was melt and kneaded at a cylinder temperature of 240° C. by use of a biaxial extruder having a screw diameter of 26 mm (produced by Toshiba Machine Co., Ltd.; TEM-26SS; L/D≈40). The resultant substance was extruded into a strand and pelletized by a pelletizer. Pellets were produced stably.

Production Example 2 [Production of Pellet for Laminate Resin (A12)]

Pelletization was performed in substantially the same manner as in production example 1 except that the ratio of the (meth)acrylate copolymer (C) and the polycarbonate (D) was 40:60. Pellets were produced stably.

Production Example 3 [Production of Pellet for Laminate Resin (A13)]

Pelletization was performed in substantially the same manner as in production example 1 except that the ratio of the (meth)acrylate copolymer (C) and the polycarbonate (D) was 50:50. It was possible to produce pellets although the pelletization was slightly unstable.

Production Example 4 [Production of Pellet for Laminate Resin (A14)]

Pelletization was performed in substantially the same manner as in production example 1 except that the ratio of the (meth)acrylate copolymer (C) and the polycarbonate (D) was 60:40. The pelletization was unstable and it was impossible to produce pellets.

Production Example 5 [Production of Pellet for Laminate Resin (A15)]

Pelletization was performed in substantially the same manner as in production example 1 except that the ratio of the (meth)acrylate copolymer (C) and the polycarbonate (D) was 20:80. Pellets were produced stably.

Production Example 6 [Production of Pellet for Laminate Resin (A21)]

30% by mass of Metablen H-880 (produced by Mitsubishi Rayon Co., Ltd.; mass-average molecular weight: 14,000) as the (meth)acrylate copolymer (C) and 70% by mass of Iupilon S-3000 (produced by Mitsubishi Engineering-Plastics Corporation; mass-average molecular weight: 27,000) as the polycarbonate (D) were put into a blender and mixed for 30 minutes. Then, the mixture was melt and kneaded at a cylinder temperature of 240° C. by use of a biaxial extruder having a screw diameter of 26 mm (produced by Toshiba Machine Co., Ltd.; TEM-26SS; L/D≈40). The resultant substance was extruded into a strand and pelletized by a pelletizer. Pellets were produced stably.

Production Example 7 [Production of Pellet for Laminate Resin (A22)]

Pelletization was performed in substantially the same manner as in production example 6 except that the ratio of the (meth)acrylate copolymer (C) and the polycarbonate (D) was 40:60. Pellets were produced stably.

Production Example 8 [Production of Thermosetting Resin Composition (a1) to be Used to Coat the Resin Layer (A)]

100 parts by mass of methyltrimethoxysilane and 1 part by mass of acetic acid were put into, and mixed in, a mixing bath equipped with a stirring blade and a dripping device, and then cooled by iced water and stirred while being kept at 0 to 10° C. Next, 84 parts by mass of 30%-by-weight solution of colloidal silica having an average particle diameter of 10 to 20 nm (Nissan Chemical Industries, Ltd.; trade name: Snowtex 30) was dripped, and the substances were stirred for 4 hours while being kept at 10° C. 84 parts by mass of 25-26%-by-weight solution of colloidal silica having an average particle diameter of 10 to 20 nm (Nissan Chemical Industries, Ltd.; trade name: Snowtex IBA-ST) was dripped, and the substances were stirred for 50 hours while being kept at 20° C. A mixture of 45 parts by mass of cellosolve acetate, 50 parts by mass of isobutyl alcohol, and 0.02 parts by mass of polyoxyalkyleneglycoldimethylsiloxane copolymer (produced by Shin-Etsu Chemical Co., Ltd.; trade name: KP-341) was dripped and mixed with the above substance while being kept at 25° C. for 1 hour. Then, 10 parts by mass of 2,4-dihydroxybenzophenone was added to 100 parts by mass of the resin content. As a result, a thermosetting resin composition (a1) was obtained.

Production Example 9 [Production of Photocurable Resin Composition (a2) to be Used to Coat the Resin Layer (A)]

A composition of 60 parts by mass of tris(2-acroxyethyl) isocyanurate (produced by Aldrich), 40 parts by mass of neopentylglycololigoacrylate (produced by Osaka Organic Chemical Industry Ltd.; trade name: 215D), 1 part by mass of 2,4,6-trimethylbenzoyldiphenylphosphineoxide (produced by Ciba Japan K.K.; trade name: DAROCUR TPO), 0.3 parts by mass of 1-hydroxycyclohexylphenylketone (produced by Aldrich), and 1 part by mass of 2-(2H-benzotriazole-2-yl)-4,6-bis(1-methyl-1-phenylethyl)phenol (produced by Ciba Japan K.K.; trade name: TINUVIN 234) was introduced into a mixing bath equipped with a stirring blade, and stirred for 1 hour while being kept at 40° C. As a result, a photocurable resin composition (a2) was obtained.

Production Example 10 [Production of Photocurable Resin Composition (b) to be Used to Coat the Substrate Layer (B)]

A composition of 40 parts by mass of 1,9-nonanedioldiacrylate (produced by Osaka Organic Chemical Industry Ltd.; trade name: Biscoat #260), 40 parts by mass of hexafunctional urethane acrylate oligomer (produced by Shin-Nakamura Chemical Co., Ltd.; trade name: U-6HA), 20 parts by mass of condensate of succinic acid/trimethylolethane/acrylic acid at a molar ratio of 1/2/4, 2.8 parts by mass of 2,4,6-trimethylbenzoyldiphenylphosphineoxide (produced by Ciba Japan K.K.; trade name: DAROCUR TPO), 1 part by mass of benzophenone (produced by Aldrich), and 1 part by mass of 2-(2H-benzotriazole-2-yl)-4,6-bis(1-methyl-1-phenylethyl)phenol (produced by Ciba Japan K.K.; trade name: TINUVIN 234) was introduced into a mixing bath equipped with a stirring blade, and stirred for 1 hour while being kept at 40° C. As a result, a photocurable resin composition (b) was obtained.

Example 1

A synthetic resin laminate was produced by use of a multi-layer extrusion device including a monoextruder having a shaft diameter of 32 mm, a monoextruder having a shaft diameter of 65 mm, a field block coupled to all the extruders, and a T-die coupled to the field block. The resin laminate (A11) obtained in production example 1 was continuously introduced into the monoextruder having a shaft diameter of 32 mm and extruded under the conditions of a cylinder temperature of 240° C. and a dispensing rate of 2.1 kg/h. A polycarbonate resin (B1) (produced by Mitsubishi Engineering-Plastics Corporation; trade name: Iupilon S-3000; mass-average molecular weight: 27,000) was continuously introduced into the monoextruder having a shaft diameter of 65 mm and extruded under the conditions of a cylinder temperature of 270° C. and a dispensing rate of 30.0 kg/h. The field block coupled to all the extruders included distribution bins of two types and two layers. (A11) and (B1) were introduced into the field block at a temperature of 270° C. and laminated. The resultant substance was extruded in the form of a sheet to the T-die coupled to the field block and having a temperature of 270° C. Three mirror-finish rolls respectively having temperatures of 130° C., 140° C. and 180° C. from the upstream side were provided. The sheet was cooled while the mirror surfaces of the mirror-finish rolls were transferred thereto. As a result, a laminate (E1) of (A11) and (B1) was obtained. The resultant laminate had a thickness of 0.1 mm, and the (A11) layer had a thickness of 60 μm in a central part thereof. The test results were as follows: good in the high temperature and high humidity exposure test with 2.5 μm, good in the pencil hardness test with F, and good in the impact resistance test with 2.3 J or greater. Comprehensively, the laminate (E1) was evaluated as being good.

Example 2

A laminate (E2) of (A11) and (B1) was obtained in substantially the same manner as in example 1 except the dispensing rate of the laminate resin (A11) used in example 1 was 3.0 kg/h and that the dispensing rate of the polycarbonate resin (B1) was 20 kg/h. The resultant laminate had a thickness of 0.5 mm, and the (A11) layer had a thickness of 60 μm in a central part thereof. The test results were as follows: good in the high temperature and high humidity exposure test with 9.8 μm, good in the pencil hardness test with F, and good in the impact resistance test with 2.3 J or greater. Comprehensively, the laminate (E2) was evaluated as being good.

Example 3

The thermosetting resin composition (a1) obtained in production example 8 was applied to the (A11) layer of the laminate (E1) obtained in example 1 by use of a bar coater such that the post-curing thickness of the thermosetting resin composition (a1) would be 3 to 8 μm, dried at 25° C. for 15 minutes, and cured by a hot air circulation drier set to 130° C. for 1 hour. As a result, a laminate (F1) in which the (A11) layer was coated with the hard-coat (a1) was obtained. The test results were as follows: good in the high temperature and high humidity exposure test with 13 μm, good in the pencil hardness test with 4H, good in the impact resistance test with 2.3 J, and good in the heat resistance test with 130° C. Comprehensively, the laminate (F1) was evaluated as being good.

Example 4

The photocurable resin composition (a2) obtained in production example 9 was applied to the (A11) layer of the laminate (E1) obtained in example 1 by use of a bar coater such that the post-curing thickness of the photocurable resin composition (a2) would be 3 to 8 μm. The resultant substance was covered with a PET film pressure-contacted thereto, and irradiated and thus cured with ultraviolet rays under the condition of a line speed of 1.5 m/min. by use of a conveyor equipped with a high voltage mercury lamp having a light source distance of 12 cm and an output of 80 W/cm. The PET film was thus delaminated. As a result, a laminate (F2) in which the (A11) layer was coated with the hard-coat (a2) was obtained. The test results were as follows: good in the high temperature and high humidity exposure test with 10 μm, good in the pencil hardness test with 3H, good in the impact resistance test with 2.3 J, good in the light resistance test with 0.4, and good in the heat resistance test with 130° C. Comprehensively, the laminate (F2) was evaluated as being good.

Example 5

The photocurable resin composition (a2) obtained in production example 9 was applied to the (A11) layer of the laminate (E1) obtained in example 1 by use of a bar coater such that the post-curing thickness of the photocurable resin composition (a2) would be 3 to 8 μm, and covered with a PET film pressure-contacted thereto. The photocurable resin composition (b) obtained in production example 10 was applied to the (B1) layer by use of a bar coater such that the post-curing thickness of the photocurable resin composition (b) would be 3 to 8 μm. The resultant substance was covered with a PET film pressure-contacted thereto, and irradiated and thus cured with ultraviolet rays under the condition of a line speed of 1.5 m/min. by use of a conveyor equipped with a high voltage mercury lamp having a light source distance of 12 cm and an output of 80 W/cm. The PET film was thus delaminated. As a result, a laminate (F3) in which the (A11) layer and the (B1) layer were respectively was coated with the hard-coat (a2) and the hard-coat (b) was obtained. The test results were as follows: good in the high temperature and high humidity exposure test with 3 μm, good in the pencil hardness test with 3H, good in the impact resistance test with 1.88 J, good in the light resistance test with 0.4, and good in the heat resistance test with 130° C. Comprehensively, the laminate (F3) was evaluated as being good.

Example 6

A laminate (F4) in which the (A11) layer was coated with the hard-coat (a1) was obtained in substantially the same manner as in example 3 except that the laminate (E2) obtained in example 2 was used instead of the laminate (E1) used in example 3 (obtained in example 1). The test results were as follows: good in the high temperature and high humidity exposure test with 49 good in the pencil hardness test with 4H, good in the impact resistance test with 2 J, and good in the heat resistance test with 130° C. Comprehensively, the laminate (F4) was evaluated as being good.

Example 7

A laminate (F5) in which the (A11) layer was coated with the hard-coat (a2) was obtained in substantially the same manner as in example 4 except that the laminate (E2) obtained in example 2 was used instead of the laminate (E1) used in example 4 (obtained in example 1). The test results were as follows: good in the high temperature and high humidity exposure test with 39 μm, good in the pencil hardness test with 3H, good in the impact resistance test with 2 J, good in the light resistance test with 0.4, and good in the heat resistance test with 130° C. Comprehensively, the laminate (F5) was evaluated as being good.

Example 8

A laminate (F6) in which the (A11) layer and the (B1) layer were respectively coated with the hard-coat (a2) and the hard-coat (b) was obtained in substantially the same manner as in example 5 except that the laminate (E2) obtained in example 2 was used instead of the laminate (E1) used in example 5 (obtained in example 1). The test results were as follows: good in the high temperature and high humidity exposure test with 12 μm, good in the pencil hardness test with 3H, good in the impact resistance test with 1.8 J, good in the light resistance test with 0.4, and good in the heat resistance test with 130° C. Comprehensively, the laminate (F6) was evaluated as being good.

Example 9

A laminate (E3) of (A12) and (B1) was obtained in substantially the same manner as in example 1 except that the resin laminate (A12) obtained in production example 2 was used instead of the resin laminate (A11) used in example 1. The resultant laminate had a thickness of 0.1 mm, and the (A12) layer had a thickness of 60 μm in a central part thereof. The test results were as follows: good in the high temperature and high humidity exposure test with 17 μm, good in the pencil hardness test with H, and good in the impact resistance test with 1.7 J. Comprehensively, the laminate (E3) was evaluated as being good.

Example 10

A laminate (E4) of (A12) and (B1) was obtained in substantially the same manner as in example 2 except that the resin laminate (A12) obtained in production example 2 was used instead of the resin laminate (A11) used in example 2. The resultant laminate had a thickness of 0.5 mm, and the (A12) layer had a thickness of 60 μm in a central part thereof. The test results were as follows: good in the high temperature and high humidity exposure test with 50 μm, good in the pencil hardness test with H, and good in the impact resistance test with 0.47 J. Comprehensively, the laminate (E4) was evaluated as being good.

Example 11

A laminate (F7) in which the (A12) layer was coated with the hard-coat (a1) was obtained in substantially the same manner as in example 3 except that the laminate (E3) obtained in example 9 was used instead of the laminate (E1) used in example 3 (obtained in example 1). The test results were as follows: good in the high temperature and high humidity exposure test with 85 μm, good in the pencil hardness test with 4H, good in the impact resistance test with 1.3 J, and good in the heat resistance test with 130° C. Comprehensively, the laminate (F7) was evaluated as being good.

Example 12

A laminate (F8) in which the (A12) layer was coated with the hard-coat (a2) was obtained in substantially the same manner as in example 4 except that the laminate (E3) obtained in example 9 was used instead of the laminate (E1) used in example 4 (obtained in example 1). The test results were as follows: good in the high temperature and high humidity exposure test with 70 μm, good in the pencil hardness test with 3H, good in the impact resistance test with 1.3 J, good in the light resistance test with 0.4, and good in the heat resistance test with 130° C. Comprehensively, the laminate (F8) was evaluated as being good.

Example 13

A laminate (F9) in which the (A12) layer and the (B1) layer were respectively coated with the hard-coat (a2) and the hard-coat (b) was obtained in substantially the same manner as in example 5 except that the laminate (E3) obtained in example 9 was used instead of the laminate (E1) used in example 5 (obtained in example 1). The test results were as follows: good in the high temperature and high humidity exposure test with 20 μM, good in the pencil hardness test with 3H, good in the impact resistance test with 1 J, good in the light resistance test with 0.4, and good in the heat resistance test with 130° C. Comprehensively, the laminate (F9) was evaluated as being good.

Example 14

A laminate (F10) in which the (A12) layer was coated with the hard-coat (a1) was obtained in substantially the same manner as in example 3 except that the laminate (E4) obtained in example 10 was used instead of the laminate (E1) used in example 3 (obtained in example 1). The test results were as follows: good in the high temperature and high humidity exposure test with 250 μm, good in the pencil hardness test with 4H, good in the impact resistance test with 0.38 J, and good in the heat resistance test with 130° C. Comprehensively, the laminate (F10) was evaluated as being good.

Example 15

A laminate (F11) in which the (A12) layer was coated with the hard-coat (a2) was obtained in substantially the same manner as in example 4 except that the laminate (E4) obtained in example 10 was used instead of the laminate (E1) used in example 4 (obtained in example 1). The test results were as follows: good in the high temperature and high humidity exposure test with 200 μm, good in the pencil hardness test with 3H, good in the impact resistance test with 0.38 J, good in the light resistance test with 0.4, and good in the heat resistance test with 130° C. Comprehensively, the laminate (F11) was evaluated as being good.

Example 16

A laminate (F12) in which the (A12) layer and the (B1) layer were respectively coated with the hard-coat (a2) and the hard-coat (b) was obtained in substantially the same manner as in example 5 except that the laminate (E4) obtained in example 10 was used instead of the laminate (E1) used in example 5 (obtained in example 1). The test results were as follows: good in the high temperature and high humidity exposure test with 55 μm, good in the pencil hardness test with 3H, good in the impact resistance test with 0.33 J, good in the light resistance test with 0.4, and good in the heat resistance test with 130° C. Comprehensively, the laminate (F12) was evaluated as being good.

Example 17

A laminate (E5) of (A13) and (B1) was obtained in substantially the same manner as in example 1 except that the resin laminate (A13) obtained in production example 3 was used instead of the resin laminate (A11) used in example 1. The resultant laminate had a thickness of 1.0 mm, and the (A13) layer had a thickness of 60 μm in a central part thereof. The test results were as follows: good in the high temperature and high humidity exposure test with 95 μm, good in the pencil hardness test with H, and good in the impact resistance test with 1.2 J. Comprehensively, the laminate (E5) was evaluated as being good.

Example 18

A laminate (E6) of (A13) and (B1) was obtained in substantially the same manner as in example 2 except that the resin laminate (A13) obtained in production example 3 was used instead of the resin laminate (A11) used in example 2. The resultant laminate had a thickness of 0.5 mm, and the (A13) layer had a thickness of 60 μm in a central part thereof. The test results were as follows: good in the high temperature and high humidity exposure test with 300 μm, good in the pencil hardness test with H, and good in the impact resistance test with 0.46 J. Comprehensively, the laminate (E6) was evaluated as being good.

A laminate (F13) in which the (A13) layer was coated with the hard-coat (a1) was obtained in substantially the same manner as in example 3 except that the laminate (E5) obtained in example 17 was used instead of the laminate (E1) used in example 3 (obtained in example 1). The test results were as follows: good in the high temperature and high humidity exposure test with 450 good in the pencil hardness test with 411, good in the impact resistance test with 0.9 J, and good in the heat resistance test with 125° C. Comprehensively, the laminate (F13) was evaluated as being good.

Example 20

A laminate (F14) in which the (A13) layer was coated with the hard-coat (a2) was obtained in substantially the same manner as in example 4 except that the laminate (E5) obtained in example 17 was used instead of the laminate (E1) used in example 4 (obtained in example 1). The test results were as follows: good in the high temperature and high humidity exposure test with 400 good in the pencil hardness test with 3H, good in the impact resistance test with 0.9 J, good in the light resistance test with 0.4, and good in the heat resistance test with 125° C. Comprehensively, the laminate (F14) was evaluated as being good.

Example 21

A laminate (F15) in which the (A13) layer and the (B1) layer were respectively coated with the hard-coat (a2) and the hard-coat (b) was obtained in substantially the same manner as in example 5 except that the laminate (E5) obtained in example 17 was used instead of the laminate (E1) used in example 5 (obtained in example 1). The test results were as follows: good in the high temperature and high humidity exposure test with 105 μm, good in the pencil hardness test with 3H, good in the impact resistance test with 0.8 J, good in the light resistance test with 0.4, and good in the heat resistance test with 125° C. Comprehensively, the laminate (F15) was evaluated as being good.

Example 22

A laminate (F16) in which the (A13) layer was coated with the hard-coat (a1) was obtained in substantially the same manner as in example 3 except that the laminate (E6) obtained in example 18 was used instead of the laminate (E1) used in example 3 (obtained in example 1). The test results were as follows: good in the high temperature and high humidity exposure test with 1500 μm, good in the pencil hardness test with 4H, good in the impact resistance test with 0.37 J, and good in the heat resistance test with 125° C. Comprehensively, the laminate (F16) was evaluated as being good.

Example 23

A laminate (F17) in which the (A13) layer was coated with the hard-coat (a2) was obtained in substantially the same manner as in example 4 except that the laminate (E6) obtained in example 18 was used instead of the laminate (E1) used in example 4 (obtained in example 1). The test results were as follows: good in the high temperature and high humidity exposure test with 1200 μm, good in the pencil hardness test with 3H, good in the impact resistance test with 0.37 J, good in the light resistance test with 0.4, and good in the heat resistance test with 125° C. Comprehensively, the laminate (F17) was evaluated as being good.

Example 24

A laminate (F18) in which the (A13) layer and the (B1) layer were respectively coated with the hard-coat (a2) and the hard-coat (b) was obtained in substantially the same manner as in example 5 except that the laminate (E6) obtained in example 18 was used instead of the laminate (E1) used in example 5 (obtained in example 1). The test results were as follows: good in the high temperature and high humidity exposure test with 350 µm, good in the pencil hardness test with 3H, good in the impact resistance test with 0.32 J, good in the light resistance test with 0.4, and good in the heat resistance test with 125° C. Comprehensively, the laminate (F18) was evaluated as being good.

Example 25

A laminate (E7) of (A13) and (B1) was obtained in substantially the same manner as in example 1 except that the resin laminate (A13) obtained in production example 3 was used instead of the resin laminate (A11) used in example 1, that the dispensing rate of the resin laminate (A13) was 1.1 kg/h and that the dispensing rate of the polycarbonate resin (B1) was 31 kg/h. The resultant laminate had a thickness of 1.0 mm, and the (A13) layer had a thickness of 30 µm in a central part thereof. The test results were as follows: good in the high temperature and high humidity exposure test with 80 µm, good in the pencil hardness test with F, and good in the impact resistance test with 1.5 J. Comprehensively, the laminate (E7) was evaluated as being good.

Example 26

A laminate (E8) of (A13) and (B1) was obtained in substantially the same manner as in example 1 except that the dispensing rate of the resin laminate (A13) used in example 25 was 1.5 kg/h and that the dispensing rate of the polycarbonate resin (B1) was 21 kg/h. The resultant laminate had a thickness of 0.5 mm, and the (A13) layer had a thickness of 30 µm in a central part thereof. The test results were as follows: good in the high temperature and high humidity exposure test with 270 µm, good in the pencil hardness test with F, and good in the impact resistance test with 0.5 J. Comprehensively, the laminate (E8) was evaluated as being good.

Example 27

A laminate (F19) in which the (A13) layer was coated with the hard-coat (a2) was obtained in substantially the same manner as in example 4 except that the laminate (E7) obtained in example 25 was used instead of the laminate (E1) used in example 4 (obtained in example 1). The test results were as follows: good in the high temperature and high humidity exposure test with 320 µm, good in the pencil hardness test with 2H, good in the impact resistance test with 1.2 J, good in the light resistance test with 0.4, and good in the heat resistance test with 125° C. Comprehensively, the laminate (F19) was evaluated as being good.

Example 28

A laminate (F20) in which the (A13) layer was coated with the hard-coat (a2) was obtained in substantially the same manner as in example 4 except that the laminate (E8) obtained in example 26 was used instead of the laminate (E1) used in example 4 (obtained in example 1). The test results were as follows: good in the high temperature and high humidity exposure test with 1100 µm, good in the pencil hardness test with 2H, good in the impact resistance test with 0.4 J, good in the light resistance test with 0.4, and good in the heat resistance test with 125° C. Comprehensively, the laminate (F20) was evaluated as being good.

Example 29

A laminate (F21) in which the (A13) layer and the (B1) layer were respectively coated with the hard-coat (a2) and the hard-coat (b) was obtained in substantially the same manner as in example 5 except that the laminate (E8) obtained in example 26 was used instead of the laminate (E1) used in example 5 (obtained in example 1). The test results were as follows: good in the high temperature and high humidity exposure test with 300 µm, good in the pencil hardness test with 2H, good in the impact resistance test with 0.35 J, good in the light resistance test with 0.4, and good in the heat resistance test with 125° C. Comprehensively, the laminate (F21) was evaluated as being good.

Example 30

A laminate (E9) of (A15) and (B1) was obtained in substantially the same manner as in example 1 except that the resin laminate (A15) obtained in production example 5 was used instead of the resin laminate (A11) used in example 1, that the dispensing rate of the resin laminate (A15) was 7.0 kg/h and that the dispensing rate of the polycarbonate resin (B1) was 25 kg/h. The resultant laminate had a thickness of 1.0 mm, and the (A15) layer had a thickness of 200 pin in a central part thereof. The test results were as follows: good in the high temperature and high humidity exposure test with 130 µm, good in the pencil hardness test with HB, and good in the impact resistance test with 1.3 J. Comprehensively, the laminate (E9) was evaluated as being good.

Example 31

A laminate (E10) of (A15) and (B1) was obtained in substantially the same manner as in example 1 except that the dispensing rate of the resin laminate (A15) used in example 30 was 10.0 kg/h and that the dispensing rate of the polycarbonate resin (B1) was 13 kg/h. The resultant laminate had a thickness of 0.5 mm, and the (A15) layer had a thickness of 200 µm in a central part thereof. The test results were as follows: good in the high temperature and high humidity exposure test with 400 µm, good in the pencil hardness test with HB, and good in the impact resistance test with 1 J. Comprehensively, the laminate (E10) was evaluated as being good.

Example 32

A laminate (F22) in which the (A15) layer was coated with the hard-coat (a2) was obtained in substantially the same manner as in example 4 except that the laminate (E9) obtained in example 30 was used instead of the laminate (E1) used in example 4 (obtained in example 1). The test results were as follows: good in the high temperature and high humidity exposure test with 520 µm, good in the pencil hardness test with 2H, good in the impact resistance test with 1 J, good in the light resistance test with 0.4, and good in the heat resistance test with 135° C. Comprehensively, the laminate (F22) was evaluated as being good.

Example 33

A laminate (F23) in which the (A15) layer was coated with the hard-coat (a2) was obtained in substantially the same manner as in example 4 except that the laminate (E10) obtained in example 31 was used instead of the laminate (E1) used in example 4 (obtained in example 1). The test results were as follows: good in the high temperature and high humidity exposure test with 1600 µm, good in the pencil hardness test with 2H, good in the impact resistance test with 0.8 J, good in the light resistance test with 0.4, and good in the heat resistance test with 135° C. Comprehensively, the laminate (F23) was evaluated as being good.

Example 34

A laminate (F24) in which the (A15) layer and the (B1) layer were respectively coated with the hard-coat (a2) and the hard-coat (b) was obtained in substantially the same manner as in example 5 except that the laminate (E10) obtained in example 31 was used instead of the laminate (E1) used in example 5 (obtained in example 1). The test results were as follows: good in the high temperature and high humidity exposure test with 500 µm, good in the pencil hardness test with 2H, good in the impact resistance test with 0.7 J, good in the light resistance test with 0.4, and good in the heat resistance test with 135° C. Comprehensively, the laminate (F24) was evaluated as being good.

Example 35

A laminate (E11) of (A13) and (B2) was obtained in substantially the same manner as in example 2 except that the resin laminate (A13) obtained in production example 3 was used instead of the resin laminate (A11) used in example 2 and that a polycarbonate resin (B2) (produced by Mitsubishi Engineering-Plastics Corporation; trade name; Iupilon H-3000; mass-average molecular weight: 19,000) was used instead of the polycarbonate resin (B1). The resultant laminate had a thickness of 0.5 mm, and the (A13) layer had a thickness of 60 µm in a central part thereof. The test results were as follows: good in the high temperature and high humidity exposure test with 100 µm, good in the pencil hardness test with H, and good in the impact resistance test with 0.43 J. Comprehensively, the laminate (E11) was evaluated as being good.

Example 36

A laminate (F25) in which the (A13) layer was coated with the hard-coat (a2) was obtained in substantially the same manner as in example 4 except that the laminate (E11) obtained in example 35 was used instead of the laminate (E1) used in example 4 (obtained in example 1). The test results were as follows: good in the high temperature and high humidity exposure test with 500 µm, good in the pencil hardness test with 3H, good in the impact resistance test with 0.34 J, good in the light resistance test with 0.4, and good in the heat resistance test with 125° C. Comprehensively, the laminate (F25) was evaluated as being good.

Example 37

A laminate (F26) in which the (A13) layer and the (B2) layer were respectively coated with the hard-coat (a2) and the hard-coat (b) was obtained in substantially the same manner as in example 5 except that the laminate (E11) obtained in example 35 was used instead of the laminate (E1) used in example 5 (obtained in example 1). The test results were as follows: good in the high temperature and high humidity exposure test with 120 µM, good in the pencil hardness test with 3H, good in the impact resistance test with 0.3 J, good in the light resistance test with 0.4, and good in the heat resistance test with 125° C. Comprehensively, the laminate (F26) was evaluated as being good.

Example 38

A laminate (E12) of (A21) and (B1) was obtained in substantially the same manner as in example 1 except that the resin laminate (A21) obtained in production example 6 was used instead of the resin laminate (A11) used in example 1. The resultant laminate had a thickness of 1.0 mm, and the (A21) layer had a thickness of 60 µm in a central part thereof. The test results were as follows: good in the high temperature and high humidity exposure test with 2.5 µm, good in the pencil hardness test with F, and good in the impact resistance test with 2.3 J or greater. Comprehensively, the laminate (E12) was evaluated as being good.

Example 39

A laminate (E13) of (A21) and (B1) was obtained in substantially the same manner as in example 2 except that the resin laminate (A21) obtained in production example 6 was used instead of the resin laminate (A11) used in example 2. The resultant laminate had a thickness of 0.5 mm, and the (A21) layer had a thickness of 60 µm in a central part thereof. The test results were as follows: good in the high temperature and high humidity exposure test with 10 µm, good in the pencil hardness test with F, and good in the impact resistance test with 2.3 J or greater. Comprehensively, the laminate (E13) was evaluated as being good.

Example 40

A laminate (E14) of (A21) and (B2) was obtained in substantially the same manner as in example 2 except that the resin laminate (A21) obtained in production example 6 was used instead of the resin laminate (A11) used in example 2 and that the polycarbonate resin (B2) was used instead of the polycarbonate resin (B1). The resultant laminate had a thickness of 0.5 mm, and the (A21) layer had a thickness of 60 µm in a central part thereof. The test results were as follows: good in the high temperature and high humidity exposure test with 10 µm, good in the pencil hardness test with F, and good in the impact resistance test with 2 J. Comprehensively, the laminate (E14) was evaluated as being good.

Example 41

A laminate (E15) of (A22) and (B1) was obtained in substantially the same manner as in example 1 except that the resin laminate (A22) obtained in production example 7 was used instead of the resin laminate (A11) used in example 1. The resultant laminate had a thickness of 1.0 mm, and the (A22) layer had a thickness of 60 µm in a central part thereof. The test results were as follows: good in the high temperature and high humidity exposure test with 17 μm, good in the pencil hardness test with H, and good in the impact resistance test with 1.7 J. Comprehensively, the laminate (E15) was evaluated as being good.

Example 42

A laminate (E16) of (A22) and (B1) was obtained in substantially the same manner as in example 2 except that the resin laminate (A22) obtained in production example 7 was used instead of the resin laminate (A11) used in example 2. The resultant laminate had a thickness of 0.5 mm, and the (A22) layer had a thickness of 60 μm in a central part thereof. The test results were as follows: good in the high temperature and high humidity exposure test with 50 μm, good in the pencil hardness test with H, and good in the impact resistance test with 0.47 J or greater. Comprehensively, the laminate (E16) was evaluated as being good.

Example 43

A laminate (E17) of (A22) and (B2) was obtained in substantially the same manner as in example 2 except that the resin laminate (A22) obtained in production example 7 was used instead of the resin laminate (A11) used in example 2 and that the polycarbonate resin (B2) was used instead of the polycarbonate resin (B1). The resultant laminate had a thickness of 0.5 mm, and the (A22) layer had a thickness of 60 μm in a central part thereof. The test results were as follows: good in the high temperature and high humidity exposure test with 50 μm, good in the pencil hardness test with H, and good in the impact resistance test with 0.43 J or greater. Comprehensively, the laminate (E17) was evaluated as being good.

Comparative Example 1

A laminate (E18) of (A3) and (B1) was obtained in substantially the same manner as in example 1 except that an MS resin (A3) (MS resin produced by Nippon Steel Chemical Co., Ltd.; trade name: MS600) was used instead of the resin laminate (A11) used in example 1 and that the cylinder temperature of the monoaxial extruder having a shaft diameter of 32 mm was 220° C. The resultant laminate had a thickness of 1.0 mm, and the (A3) layer had a thickness of 60 μm in a central part thereof. In addition, a laminate (F27) in which the (A3) layer and the (B1) layer of the laminate (E18) were respectively coated with the hard-coat (a2) and the hard-coat (b) was obtained in substantially the same manner as in example 5. The test results were as follows: not good in the high temperature and high humidity exposure test with 400 μm, not good in the impact resistance test with 0.7 J, and not good in the heat resistance test with 95° C. Comprehensively, the laminates (E18) and (F27) were evaluated as not being good.

Comparative Example 2

A laminate (E19) of (A3) and (B1) was obtained in substantially the same manner as in example 2 except that the MS resin (A3) (MS resin produced by Nippon Steel Chemical Co., Ltd.; trade name: MS600) was used instead of the resin laminate (A11) used in example 2 and that the cylinder temperature of the monoaxial extruder having a shaft diameter of 32 mm was 220° C. The resultant laminate had a thickness of 0.5 mm, and the (A3) layer had a thickness of 60 μm in a central part thereof. The test results were as follows: not good in the high temperature and high humidity exposure test with 1000 μm, and not good in the impact resistance test with 0.19 J. Comprehensively, the laminate (E19) was evaluated as not being good.

Comparative Example 3

A laminate (E20) of (A4) and (B1) was obtained in substantially the same manner as in example 1 except that a poly(methyl methacrylate) resin (A4) (produced by ARKEMA; trade name: ALTUGLAS V020) was used instead of the resin laminate (A11) used in example 1. The resultant laminate had a thickness of 1.0 mm, and the (A4) layer had a thickness of 60 μm in a central part thereof. In addition, a laminate (F28) in which the (A4) layer and the (B1) layer of the laminate (E20) were respectively coated with the hard-coat (a2) and the hard-coat (b) was obtained in substantially the same manner as in example 5. The test results were as follows: not good in the high temperature and high humidity exposure test with 1200 μm, not good in the impact resistance test with 0.4 J, and not good in the heat resistance test with 110° C. Comprehensively, the laminates (E20) and (F28) were evaluated as not being good.

Comparative Example 4

A laminate (E21) of (A4) and (B1) was obtained in substantially the same manner as in example 2 except that the poly(methyl methacrylate) resin (A4) (produced by ARKEMA; trade name: ALTUGLAS V020) was used instead of the resin laminate (A11) used in example 2. The resultant laminate had a thickness of 0.5 mm, and the (A4) layer had a thickness of 60 μm in a central part thereof. The test results were as follows: not good in the high temperature and high humidity exposure test as being unmeasurable, and not good in the impact resistance test with 0.15 J. Comprehensively, the laminate (E21) was evaluated as not being good.

Comparative Example 5

A laminate (E22) of (A5) and (B1) was obtained in substantially the same manner as in example 2 except that a polycarbonate resin (A5) (produced by Mitsubishi Engineering-Plastics Corporation; trade name: Iupilon H-3000; mass-average molecular weight: 19,000) was used instead of the resin laminate (A11) used in example 2. The resultant laminate had a thickness of 0.5 mm. The thickness of the (A5) layer was not found because the (A5) layer was not easily distinguishable from the (B1) layer. In addition, a laminate (F29) in which the (A5) layer of the laminate (E22) was coated with the hard-coat (a1) was obtained in substantially the same manner as in example 3. The test results were as follows: good in the high temperature and high humidity exposure test with 20 μm, but not good in the pencil hardness test with HB. Comprehensively, the laminates (E22) and (F29) were evaluated as not being good.

TABLE 1

| Ex. | Laminate resin Symbol | Acrylate copolymer C [% by mass] | Poly-carbonate D [% by mass] | Water absorption ratio [%] | Glass transition point [° C.] | Pellet production |
|---|---|---|---|---|---|---|
| Production ex. 1 | A11 | Metablen H-880 30 | E-2000 70 | 0.14 | 125 | Possible |
| Production ex. 2 | A12 | Metablen H-880 40 | E-2000 60 | 0.17 | 123 | Possible |
| Production ex. 3 | A13 | Metablen H-880 50 | E-2000 50 | 0.2 | 118 | Possible |
| Production ex. 4 | A14 | Metablen H-880 60 | E-2000 40 | Not measured | Not measured | Impossible |
| Production ex. 5 | A15 | Metablen H-880 20 | E-2000 80 | 0.1 | 130 | Possible |
| Production ex. 6 | A21 | Metablen H-880 30 | S-3000 70 | 0.14 | 125 | Possible |
| Production ex. 7 | A22 | Metablen H-880 40 | S-3000 60 | 0.17 | 120 | Possible |

| Ex. | Laminate resin Symbol | Trade name | Water absorption ratio [%] | Glass transition point [° C.] | Pellet production |
|---|---|---|---|---|---|
| Reference ex. 1 | A3 | MS resin: MS600 | 0.1 | 90 | Commercially available |
| Reference ex. 2 | A4 | Poly(methy methacrylate): V020 | 0.3 | 105 | Commercially available |
| Reference ex. 3 | A5 | Polycarbonate resin: H-3000 | 0.05 | 145 | Commercially available |

TABLE 2

| Ex. | Layer structure | Thickness (μm) | (A) layer hard-coat | (B) layer hard-coat | Laminate | High temperature high humidity exposure Shape stability | Pencil hardness (B) layer | Impact resistance Fall energy | Light resistance ΔYI | Heat resistance Temperature | Comprehensive evaluation |
|---|---|---|---|---|---|---|---|---|---|---|---|
| Ex. 1 | A11/S3000 | 60/940 | absent | absent | E1 | 2.5 μm ○ | F ○ | 2.3 J or greater ○ | — | — | ○ |
| Ex. 2 | A11/S3000 | 60/440 | absent | absent | E2 | 9.8 μm ○ | F ○ | 2.3 J or greater ○ | — | — | ○ |
| Ex. 3 | A11/S3000 | 60/940 | a1 | absent | F1 | 13 μm ○ | 4H ○ | 2.3 J ○ | — | 130° C. ○ | ○ |
| Ex. 4 | A11/S3000 | 60/940 | a2 | absent | F2 | 10 μm ○ | 3H ○ | 2.3 J ○ | 0.4 ○ | 130° C. ○ | ○ |
| Ex. 5 | A11/S3000 | 60/940 | a2 | b | F3 | 3 μm ○ | 3H ○ | 1.88 J ○ | 0.4 ○ | 130° C. ○ | ○ |
| Ex. 6 | A11/S3000 | 60/440 | a1 | absent | F4 | 49 μm ○ | 4H ○ | 2 J ○ | — | 130° C. ○ | ○ |
| Ex. 7 | A11/S3000 | 60/440 | a2 | absent | F5 | 39 μm ○ | 3H ○ | 2 J ○ | 0.4 ○ | 130° C. ○ | ○ |
| Ex. 8 | A11/S3000 | 60/440 | a2 | b | F6 | 12 μm ○ | 3H ○ | 1.8 J ○ | 0.4 ○ | 130° C. ○ | ○ |
| Ex. 9 | A12/S3000 | 60/940 | absent | absent | E3 | 17 μm ○ | H ○ | 1.7 J ○ | — | — | ○ |
| Ex. 10 | A12/S3000 | 60/440 | absent | absent | E4 | 50 μm ○ | H ○ | 0.47 J ○ | — | — | ○ |
| Ex. 11 | A12/S3000 | 60/940 | a1 | absent | F7 | 85 μm ○ | 4H ○ | 1.3 J ○ | — | 130° C. ○ | ○ |
| Ex. 12 | A12/S3000 | 60/940 | a2 | absent | F8 | 70 μm ○ | 3H ○ | 1.3 J ○ | 0.4 ○ | 130° C. ○ | ○ |
| Ex. 13 | A12/S3000 | 60/940 | a2 | b | F9 | 20 μm ○ | 3H ○ | 1 J ○ | 0.4 ○ | 130° C. ○ | ○ |
| Ex. 14 | A12/S3000 | 60/440 | a1 | absent | F10 | 250 μm ○ | 4H ○ | 0.38 J ○ | — | 130° C. ○ | ○ |
| Ex. 15 | A12/S3000 | 60/440 | a2 | absent | F11 | 200 μm ○ | 3H ○ | 0.38 J ○ | 0.4 ○ | 130° C. ○ | ○ |
| Ex. 16 | A12/S3000 | 60/440 | a2 | b | F12 | 55 μm ○ | 3H ○ | 0.33 J ○ | 0.4 ○ | 130° C. ○ | ○ |

TABLE 2-continued

| Ex. | Layer structure | Thickness (μm) | (A) layer hardcoat | (B) layer hardcoat | Laminate | High temperature high humidity exposure Shape stability | Pencil hardness (B) layer | Impact resistance Fall energy | Light resistance ΔYI | Heat resistance Temerature | Comprehensive evaluation |
|---|---|---|---|---|---|---|---|---|---|---|---|
| Ex. 17 | A13/S3000 | 60/940 | absent | absent | E5 | 95 μm ○ | H ○ | 1.2 J ○ | — | — | ○ |
| Ex. 18 | A13/S3000 | 60/440 | absent | absent | E6 | 300 μm ○ | H ○ | 0.46 J ○ | — | — | ○ |
| Ex. 19 | A13/S3000 | 60/940 | a1 | absent | F13 | 450 μm ○ | 4H ○ | 0.9 J ○ | — | 125° C. ○ | ○ |
| Ex. 20 | A13/S3000 | 60/940 | a2 | absent | F14 | 400 μm ○ | 3H ○ | 0.9 J ○ | 0.4 ○ | 125° C. ○ | ○ |
| Ex. 21 | A13/S3000 | 60/940 | a2 | b | F15 | 105 μm ○ | 3H ○ | 0.8 J ○ | 0.4 ○ | 125° C. ○ | ○ |
| Ex. 22 | A13/S3000 | 60/440 | a1 | absent | F16 | 1500 μm ○ | 4H ○ | 0.37 J ○ | — | 125° C. ○ | ○ |
| Ex. 23 | A13/S3000 | 60/440 | a2 | absent | F17 | 1200 μm ○ | 3H ○ | 0.37 J ○ | 0.4 ○ | 125° C. ○ | ○ |
| Ex. 24 | A13/S3000 | 60/440 | a2 | b | F18 | 350 μm ○ | 3H ○ | 0.32 J ○ | 0.4 ○ | 125° C. ○ | ○ |
| Ex. 25 | A13/S3000 | 30/970 | absent | absent | E7 | 80 μm ○ | F ○ | 1.5 J ○ | — | — | ○ |
| Ex. 26 | A13/S3000 | 30/470 | absent | absent | E8 | 270 μm ○ | F ○ | 0.5 J ○ | — | — | ○ |
| Ex. 27 | A13/S3000 | 30/970 | a2 | absent | F19 | 320 μm ○ | 2H ○ | 1.2 J ○ | 0.4 ○ | 125° C. ○ | ○ |
| Ex. 28 | A13/S3000 | 30/470 | a2 | absent | F20 | 1100 μm ○ | 2H ○ | 0.4 J ○ | 0.4 ○ | 125° C. ○ | ○ |
| Ex. 29 | A13/S3000 | 30/470 | a2 | b | F21 | 300 μm ○ | 2H ○ | 0.35 J ○ | 0.4 ○ | 125° C. ○ | ○ |
| Ex. 30 | A15/S3000 | 200/800 | absent | absent | E9 | 130 μm ○ | HB ○ | 1.3 J ○ | — | — | ○ |
| Ex. 31 | A15/S3000 | 200/300 | absent | absent | E10 | 400 μm ○ | HB ○ | 1 J ○ | — | — | ○ |
| Ex. 32 | A15/S3000 | 200/800 | a2 | absent | F22 | 520 μm ○ | 2H ○ | 1 J ○ | 0.4 ○ | 135° C. ○ | ○ |
| Ex. 33 | A15/S3000 | 200/300 | a2 | absent | F23 | 1600 μm ○ | 2H ○ | 0.8 J ○ | 0.4 ○ | 135° C. ○ | ○ |
| Ex. 34 | A15/S3000 | 200/300 | a2 | b | F24 | 500 μm ○ | 2H ○ | 0.7 J ○ | 0.4 ○ | 135° C. ○ | ○ |
| Ex. 35 | A13/H3000 | 60/440 | absent | absent | E11 | 100 μm ○ | H ○ | 0.43 J ○ | — | — | ○ |
| Ex. 36 | A13/H3000 | 60/440 | a2 | absent | F25 | 500 μm ○ | 3H ○ | 0.34 J ○ | 0.4 ○ | 125° C. ○ | ○ |
| Ex. 37 | A13/H3000 | 60/440 | a2 | b | F26 | 120 μm ○ | 3H ○ | 0.3 J ○ | 0.4 ○ | 125° C. ○ | ○ |
| Ex. 38 | A21/S3000 | 60/940 | absent | absent | E12 | 2.5 μm ○ | F ○ | 2.3 J or greater ○ | — | — | ○ |
| Ex. 39 | A21/S3000 | 60/440 | absent | absent | E13 | 10 μm ○ | F ○ | 2.3 J or greater ○ | — | — | ○ |
| Ex. 40 | A21/H3000 | 60/440 | absent | absent | E14 | 10 μm ○ | F ○ | 2 J ○ | — | — | ○ |
| Ex. 41 | A22/S3000 | 60/940 | absent | absent | E15 | 17 μm ○ | H ○ | 1.7 J ○ | — | — | ○ |
| Ex. 42 | A22/S3000 | 60/440 | absent | absent | E16 | 50 μm ○ | H ○ | 0.47 J ○ | — | — | ○ |
| Ex. 43 | A22/H3000 | 60/440 | absent | absent | E17 | 50 μm ○ | H ○ | 0.43 J ○ | — | — | ○ |
| Comparative ex. 1 | MS/S3000 | 60/940 | a2 | b | E18, F27 | 400 μm X | 3H ○ | 0.7 J X | 0.4 ○ | 95° C. X | X |
| Comparative ex. 2 | MS/S3000 | 60/440 | absent | absent | E19 | 1000 μm X | F ○ | 0.19 J X | — | — | X |
| Comparative ex. 3 | PMMA/S3000 | 60/940 | a2 | b | E20, F28 | 1200 μm X | 4H ○ | 0.4 J X | 0.4 ○ | 110° C. X | X |
| Comparative ex. 4 | PMMA/S3000 | 60/440 | absent | absent | E21 | Unmeasurable X | 2H ○ | 0.15 J X | — | — | X |

TABLE 2-continued

| Ex. | Layer structure | Thickness (μm) | (A) layer hard-coat | (B) layer hard-coat | Laminate | High temperature high humidity exposure Shape stability | Pencil hardness (B) layer | Impact resistance Fall energy | Light resistance ΔYI | Heat resistance Temperature | Comprehensive evaluation |
|---|---|---|---|---|---|---|---|---|---|---|---|
| Comparative ex. 5 | H3000/ S3000 | 60/440 | a1 | absent | E22, F29 | 20 μm ○ | HB X | 2.3 J or greater ○ | — | 150° C. ○ | X |

○: good;
X: not good;
—: items not to measured
MS: MS resin
PMMA: poly(methyl methacrylate) resin From Tables 1 and 2, it is seen that a synthetic resin laminate according to the present invention is excellent in shape stability against a high temperature and high humidity environment, surface hardness, impact resistance, climate resistance and heat resistance.

INDUSTRIAL APPLICABILITY

A synthetic resin laminate according to the present invention has a feature of being excellent in shape stability against a high temperature and high humidity environment, surface hardness, impact resistance, climate resistance and heat resistance, and is preferably usable as a transparent substrate material, a transparent protective material or the like, especially for front plates of display sections of information appliances and mobile electronic devices, substrates of touch panels and sheets for heat bending.

The invention claimed is:
1. A synthetic resin laminate, comprising:
a substrate layer (B) containing polycarbonate; and
a resin layer (A) laminated on one or both of two surfaces of the resin layer (B), the resin layer (A) containing 5 to 55% by mass of (meth)acrylate copolymer (C) and 95 to 45% by mass of polycarbonate (D),
wherein the (meth)acrylate copolymer (C) contains an aromatic (meth)acrylate unit (c1) and a methyl methacrylate unit (c2) at a mass ratio (c1/c2) of 5-80/20-95, and the (meth)acrylate copolymer (C) has a mass-average molecular weight of 5,000 to 30,000, and
wherein the resin layer (A) and/or the substrate layer (B) contains an ultraviolet absorber, wherein the ultraviolet absorber consists of at least one selected from the group consisting of 2,4-dihydroxybenzophenone, 2-hydroxy-4-methoxybenzophenone, 2-hydroxy-4-n-octoxybenzophenone, 2-hydroxy-4-dodecyloxybenzophenone, 2-hydroxy-4-octadecyloxybenzophenone, 2,2'-dihydroxy-4-methoxybenzophenone, 2,2'-dihydroxy-4,4'-dimethoxybenzophenone, 2,2'-4,4'-tetrahydroxybenzophenone; 2-(2-hydroxy-5-methylphenyl)benzotriazole, 2-(2-hydroxy-3,5-di-t-butylphenyl)benzotriazole, 2-(2-hydroxy-3-t-butyl-5-methylphenyl)benzotriazole, (2H-benzotriazole-2-yl)-4,6-bis(1-methyl-1-phenylethyl) phenol; phenyl salicylate, 2,4-di-t-butylphenyl-3,5-di-t-butyl-4-hydroxybenzoate; bis(2,2,6,6-tetramethylpiperidine-4-yl)sebacate; 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenhyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, and 2,4-diphenyl-6-(2-hydroxy-4-benzyloxyphenyl)-1,3,5-triazine.

2. The synthetic resin laminate according to claim 1, wherein the resin layer (A) has a glass transition point of 110 to 130° C.

3. The synthetic resin laminate according to claim 1, wherein the resin layer (A) has a water absorption ratio of 0.03 to 0.28%.

4. The synthetic resin laminate according to claim 1, wherein the resin layer (A) has a thickness of 10 to 250 μm, the synthetic resin laminate has a total thickness (X) of 0.1 to 2.0 mm, and the thickness ratio (A)/(X) is 0.01 to 0.5.

5. The synthetic resin laminate according to claim 1, wherein the substrate layer (B) has a mass-average molecular weight of 18,000 to 40,000.

6. The synthetic resin laminate according to claim 1, wherein the resin layer (A) is hard-coated.

7. The synthetic resin laminate according to claim 1, wherein the resin layer (A) and the substrate layer (B) are hard-coated.

8. The synthetic resin laminate according to claim 1, wherein one or both of two surfaces of the synthetic resin laminate is obtained as a result of at least one of a reflection preventive treatment, an antifouling treatment, an anti-fingerprint treatment, an antistatic treatment, a climate-proof treatment, and an anti-glare treatment.

9. A transparent substrate material, comprising the synthetic resin laminate according to claim 1.

10. A transparent protective material, comprising the synthetic resin laminate according to claim 1.

11. The synthetic resin laminate of claim 1, wherein the resin layer (A) containing 5 by mass of (meth)acrylate copolymer (C) and 95 by mass of polycarbonate (D), wherein the (meth)acrylate copolymer (C) contains an aromatic (meth)acrylate unit (c1) and a methyl methacrylate unit (c2) at a mass ratio (c1/c2) of 5/95.

* * * * *